April 17, 1956  R. W. POINTER  2,742,302
ARM AND JOINT FOR CONNECTING A VEHICLE AXLE AND FRAME
Filed Feb. 24, 1953

INVENTOR
Robert W. Pointer
BY Evans & McCoy
ATTORNEYS

United States Patent Office 2,742,302
Patented Apr. 17, 1956

2,742,302
ARM AND JOINT FOR CONNECTING A VEHICLE AXLE AND FRAME

Robert W. Pointer, Portland, Oreg., assignor to The General Tire and Rubber Company, Akron, Ohio, a corporation of Ohio Application February 24, 1953, Serial No. 338,189

9 Claims. (Cl. 280—124)

This invention relates to vehicle suspension systems and is particularly concerned with the torque and thrust controlling arms used in connecting transverse axles to vehicle frames for articulation of the axles.

In vehicle suspension systems, particularly those of the pneumatic cushion type, provision is made for resisting relative horizontal and torque forces between the axles and vehicle frames by means of torque arms to relieve the supporting cushions or springs of such loads. The connection or joint between the torque arm and the vehicle frame is subjected to severe and complex loads, not limited to those of thrust and torque as the name would imply, which loads must be accommodated without imparting objectionable vibrations or forces to the vehicle frame. The present invention provides a generally improved axle connecting arm construction in which the structural components are relatively lightweight and in which the joint or connection between the torque arm and the frame is effected through resilient deformable cushion elements, preferably annular in shape, which accommodate relative twisting, turning and thrusting movements without objectionable strain on the vehicle frame and which also absorb and damp out vibrations.

The principal object of the invention is to provide a frame and axle connecting structure of the character mentioned in which a universal joint employing one or more rubber annuluses as a deformable cushion or cushions is so constructed and arranged as to provide a strong interlocking connection of metal parts carried respectively by the frame and by the axle so that in the event of failure or deterioration of the annulus or annuluses, the connection between the axle and the frame is maintained.

Another object is to provide a connecting structure of the character mentioned in which a resilient universal joint comprises components that are readily taken apart and re-assembled as in the case of repair or replacement of the rubber cushion or cushions.

Another object is to provide an arm structure for use in the connection between the frame and axle of a vehicle in which the arm is made of standard rolled metal steel sections, such sections being secured to the axle and to an attaching part of the universal joint by angularly disposed or intersecting lines of welding.

A further object is to provide a universal joint for use in the connection between a vehicle frame and the running gear of a vehicle in which a rubber annulus is confined in a cylindrical open-ended socket or housing and embraces an elongated spindle which extends through the cylindrical socket in coaxial relation thereto.

Other objects and advantages pertaining to certain novel features of construction and combinations and arrangements of parts which obtain simplicity and economy in manufacture are apparent in the following detailed description of suitable embodiments of the invention, this description being made in connection with the accompanying drawings forming part of the specification.

Figure 1:
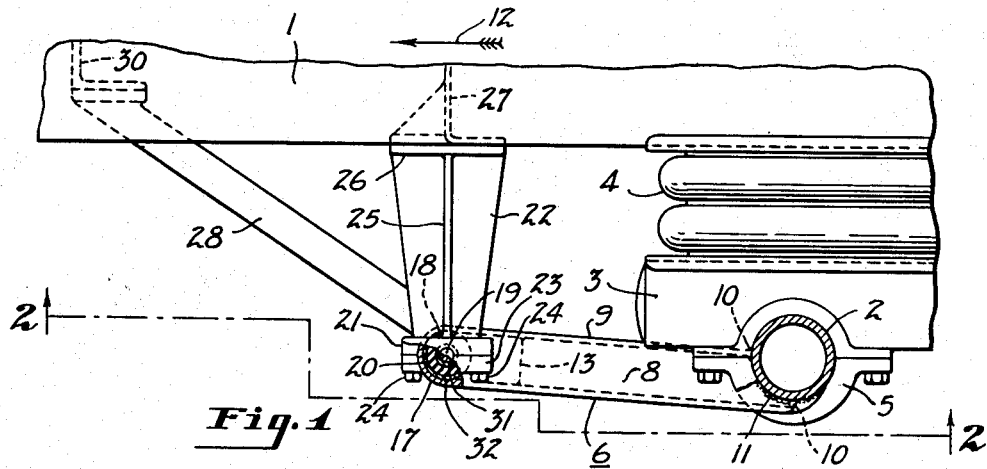
Figure 1 is a fragmentary elevational view, partly diagrammatic, partly in section and with parts broken away and removed, showing the axle connecting arm and joint structure of the present invention and its relationship to the other components of a vehicle suspension system of the pneumatic cushion type.
Figure 2:
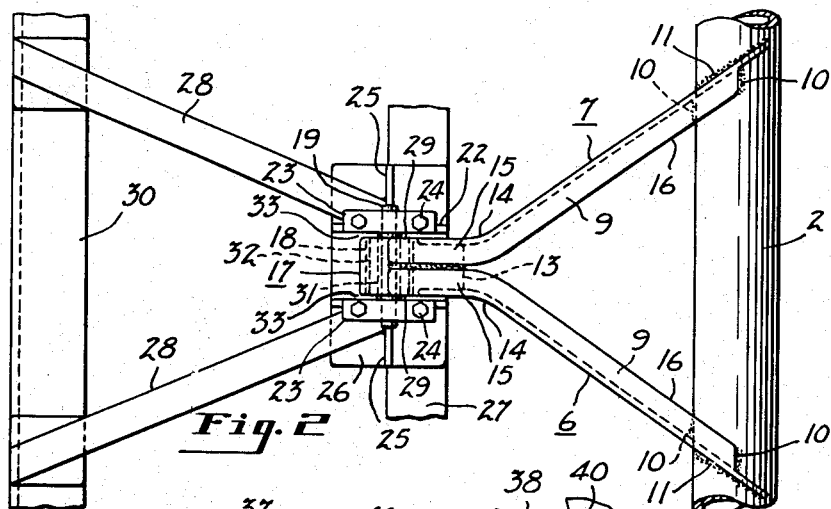
Fig. 2 is a bottom view of the arm and joint structure of Fig. 1, this view being taken in an upward direction substantially along the line indicated at 2—2 of Fig. 1.
Figures 3, 4:
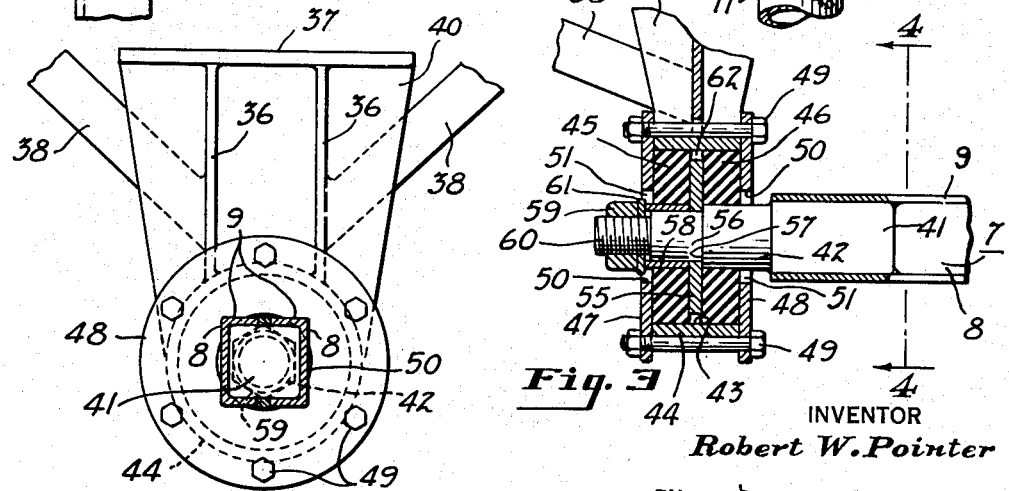

Fig. 3 is a fragmentary elevational view, partly in section and with parts broken away and removed, showing a modified joint and frame bracket for use in the axle and frame connecting structure shown in general combination in Figs. 1 and 2 and enlarged with respect to those figures; and Fig. 4 is a fragmentary elevational view of the modified joint and bracket, partly in section, taken substantially along the line indicated at 4—4 of Fig. 3.

Vehicles having suspension systems of the type in which the vehicle frame is cushioned on an axle as by means of air cell structures customarily use so-called torque arms to connect the axles to the frames for transmitting horizontal and other forces between the axles and the vehicle frames and for resisting turning of the axles relative to the frames, such as tends to occur upon the application of brakes or driving torque to the wheels carried by the axles. The present invention is concerned with the axle connecting structure, this structure finding numerous applications in the field of vehicle suspensions, the principles set forth being applicable to suspensions using coil and other metal springs as well as pneumatic cushion suspensions of the type illustrated. For simplicity and convenience the invention is illustrated as it is applied to a pneumatic cushion suspension system such as described in my copending application for patent, Serial No. 142,428, filed February 4, 1950, of which this is a continuation in part.

The suspension system is intended particularly for use in a heavy duty highway trailer of the dual axle type, although of course it is suitable, with appropriate modifications of design, to smaller vehicles and self-propelled vehicles such as trucks and busses. The vehicle frame, most of which is omitted from the drawings, includes a pair of spaced generally parallel side members, one of which, the left side member, is indicated at 1, Fig. 1. As explained in the patent application referred to, the spaced frame members of the vehicle are supported on transverse dual axles, one of which is shown at 2, by means of pneumatic cushion assemblies comprising spaced metal air boxes, one of which is shown at 3, and plural cell pneumatic cushions 4. One of the air boxes and a set of the cushion cells underlie each of the side frame members of the vehicle to support the frame members on the axles. The wheels carried by the axle 2 are omitted from the drawings for clarity.

Each of the air boxes is formed with transverse semi-cylindrical recesses across its under side to accommodate the axles, the latter being secured in the recesses as by removable screw held caps, one of which is indicated at 5.

Extending forwardly from the axle and converging toward one another are a pair of arms 6 and 7. These arms are each formed of rolled steel members of angle or, preferably and as shown, of channel section so that each arm has a longitudinally extending web portion 8 and one or more flange portions 9. The rear ends of the arms, attached to the axle 2, are relieved or cut away to the contour of the axle and are connected to the latter as by angularly disposed lines of welding, welding lines 10 along the end edges of arm flanges 9 being generally longitudinal or parallel to the axis of the axle and welding lines 11 along the end edges of arm webs 8 being generally circumferential or transverse to the axle.

Each arm is formed with a bend 14 intermediate its ends so that relatively short forward portions 15 of the arms are generally parallel to one another while relatively long rearward portions 16 are divergent or angularly disposed. The arms are arranged so that the channels open toward one another, corresponding flanges 9 of the two arms being disposed substantially in common planes and the webs 8 being spaced from one another. The forward or parallel portions 15 of the arms thus enclose or define a noncircular space in which is received butt or anchoring end 13 of a terminal block or attaching part 17 (Figs. 1 and 2) and has a coupling and extending forwardly beyond the ends of the arms 6 and 7.

In the embodiment of the invention shown in Figs. 1 and 2, the forwardly extending attaching part of the terminal block has a transverse open-ended cylindrical socket 18 formed therein, this socket receiving in coaxial relation a cylindrically shaped spindle or attaching part 19 which is rigid with the vehicle frame and spaced from the walls of the socket 18. A molded rubber annulus 20 is confined in the cylindrical socket 18 and embraces the spindle 19 as a deformable cushion in the provision of a universal joint that permits tilting and limited twisting and rocking of the axle 2 relative to the vehicle frame, as will appear.

The ends of the spindle 19 project axially beyond side walls 29 of the attaching part of the terminal block 17 and are clamped in cylindrical recesses formed half in bottom clamp elements 21 of depending brackets 22 and half in caps 23 fastened to the bracket clamp elements 21 as by threaded cap screws 24. The bracket 22 may be cast, forged or fabricated of welded together steel plates and desirably includes strengthening webs 25. At its upper end the bracket may have a horizontal plate 26 welded or otherwise secured against the bottom of a transverse member 27 of the vehicle frame. Diagonal braces 28 extend from the lower ends of the bracket member 22 upwardly and forwardly in divergent relation and at their ends remote from the bracket are secured as by welding to spaced points of a cross member 30 of the vehicle frame.

As a refinement of the invention, the resilient rubber cushion annulus 20 is compressed between inner and outer tubular steel sleeves 31 and 32, these sleeves confining the rubber and facilitating assembly of the rubber cushion in the terminal block 17. The inner sleeve 31, received as by a press fit about the spindle 19 and non-rotatable thereon, may project axially beyond the ends of the cushion 20, being longer than the sleeve 32, as shown in Fig. 2, to locate or center the terminal block 17 between the spaced bottom pairs of clamp and cap elements on the bracket 22. Clearance spaces 33 thus provided between the bottom portions 21 and 23 of the bracket 22 and the side walls 29 of the terminal block 17 permit a slight lateral movement and twisting of the forward end of the torque arm assembly relative to the bracket in accommodating the structure to the movements of the axle 2.

In Figs. 3 and 4 is illustrated a modification of the invention concerned chiefly with the connection of the terminal block of the torque and thrust controlling arm to the depending vehicle frame bracket here indicated at 40.

In this modification the depending bracket 40 is cast, forged, or assembled by welding together steel plates and includes strengthening ribs 36 which, together with the main plate portion 40, abut against the bottom of a horizontal top plate 37 corresponding to the horizontal plate 26 described in connection with Figs. 1 and 2. This plate is secured to a cross member of the vehicle frame as previously described. Diagonal braces 38 extend between the lower portion of the bracket 40 and a forward part of the vehicle frame to reinforce the bracket against thrust and other loads. The terminal block, indicated at 41 and corresponding to the terminal block 17 previously described, is formed with a forwardly directed cylindrical spindle portion 42 which extends through a cylindrical chamber 43 in a cylindrical housing portion 44 formed on the bottom of the bracket 40. The chamber 43 is of large diameter relative to the spindle 42, the latter being coaxial to the chamber walls in the provision of an annular clearance space in which are received a plurality of resilient deformable cushion annuluses 45 and 46. The annuluses are confined in the housing 44 by front and rear retention plates 47 and 48 disposed across the circular openings into the chamber 43. The retention plates are generally parallel to one another and are held against the front and rear faces of the housing 44 by thru-bolts 49. The retention plates are formed with circular openings 50 on the axis of the chamber 43 to receive the spindle 42, the plate openings being larger than the spindle to provide clearances 51 accommodating radial shifting and movement of the spindle during twisting and vibrating of the spindle incidental to the working of the suspension system.

Axial movement of the spindle relative to the housing 44 is resisted by a circular thrust plate 55 disposed between the cushion annuluses 45 and 46 and received over a reduced diameter portion 56 on the spindle. The thrust plate is held against shoulder 57 at the end of the reduced diameter spindle portion 56 by a sleeve 58 telescoped over the spindle, the sleeve being held in place by a nut 59 screwed onto threaded end 60 of the spindle. A washer 61 is interposed between the nut and the sleeve 58. The thrust plate 55 is of less diameter than the chamber walls 43 in the housing in the provision of an annular clearance 62 by which the thrust plate periphery is separated from the housing walls to permit slight radial shifting and movement of the spindle incidental to normal working of the suspension system. Under severe radial loads, however, the thrust plate edge engages the cylindrical wall 43 of the housing 44 to prevent excessive relative movement of the parts.

The diameter of the thrust plate 55 is greater than the diameter of the openings 50 in the retention plates 47 and 48 to provide a radial overlapping of the inwardly directed flange-like retention plates 47 and 48 and the outwardly directed circular flange-like thrust plate 55. There is thus obtained a positive mechanical interlock which prevents separation of the terminal block 41 of the axle connecting arm from the depending frame bracket 40 under thrust loads of the arm sufficient to cause severe deformation, or even failure, of the rubber cushion annuluses 45 and 46.

The present invention thus provides an inexpensive, lightweight structure for connecting the running gear to the vehicle frame of a highway vehicle by the use of the standard rolled metal angle bars or channels 6 and 7. It is feasible to make the torque or connecting arm in small shops without the use of special forging or steel casting equipment. The terminal block 17 (or 41) is a relatively small item in the assembly and can be either machined from solid stock or, if facilities are available, can be cast or forged. The connection includes a universal joint in which positively interlocked metal parts are normally separated from one another by a rubber cushion annulus which carries the normal loads transferred between axle and frame by the torque arm assembly.

In accordance with the patent statutes the principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim and desire to secure by Letters Patent of the United States is:

1. A torque and thrust controlling structure for the suspension system of a vehicle having a frame, an axle, and resilient cushion elements mounted on said axle near opposite sides of said frame supporting the frame on the axle and permitting tilting of the latter, said structure comprising arm means rigidly secured to the axle between said cushion elements and including a spindle elongated in the general direction of vehicle travel, a bracket member depending from the frame of the vehicle and having a substantially cylindrical socket surrounding and substantially coaxial with the spindle, a resilient deformable rubber annulus interposed between the spindle and the socket walls, a flat annular thrust plate secured to the spindle and extending radially therefrom within the socket, a radial substantially annular flange carried by the socket member and projecting across the end of the socket, and a resilient deformable rubber annulus confined between said radial flange and said thrust plate.

2. A torque and thrust controlling structure for the suspension system of a vehicle having a frame, a wheel-carrying axle, and resilient cushion means mounted on the axle near each side of the vehicle and interposed between the axle and the frame to support the frame on the axle while permitting tilting of the latter, said structure comprising: a pair of angularly disposed channel-shaped arms each of rolled metal and, in section, each having angularly disposed web and flange portions, said arms having one pair of corresponding ends disposed together with their flange portions in substantially the same plane and their web portions in spaced confronting relation, the other pair of corresponding ends of the arms being welded to spaced points on the axle between the cushion means at opposite sides of the vehicle, a terminal block having a portion disposed in the space between said web portions of the arms and having an attaching part, said flange portions being welded together and to said block, a rigid bracket member depending from said frame and including an attaching part, one of said attaching parts being formed with a substantially cylindrical socket, the other of said parts having an elongated spindle coaxial with the socket and projecting beyond the opposite ends of the socket, resilient deformable annular rubber cushion means embracing the spindle and confined in the socket, and means for resisting axial shifting of the rubber cushion relative to both the socket part and the spindle part.

3. A structure as defined in claim 2 wherein said socket is formed in said bracket member and has an axis extending perpendicular to said axle, said terminal block having externally cylindrical portions forming said spindle and a flat annular thrust plate secured to the spindle and extending radially therefrom between said cushion means, said bracket having flat retention plates that engage the cushion means at the opposite ends of said socket.

4. A torque and thrust controlling structure as defined in claim 2 wherein said socket is formed in said terminal block and has an axis parallel to said axle, said bracket member having an attaching portion extending through the terminal block and forming said spindle, and means spaced from said terminal block for supporting said spindle.

5. A torque and thrust controlling structure as defined in claim 4 wherein said cushion means comprises an inner metal sleeve rigidly mounted on said spindle and having a length greater than the axial width of the terminal block, an outer metal sleeve having a length less than that of the inner sleeve, and a resilient rubber cushion annulus under radial compression between said metal sleeves, said inner metal sleeve being held against axial movement relative to said bracket member.

6. A torque and thrust controlling structure for the suspension system of a vehicle having a frame, an axle and resilient cushioning means supporting the frame on the axle and permitting tilting of the latter, said structure comprising arm means rigidly secured to the axle and including an attaching part remote from the axle, a rigid bracket member depending from the frame of the vehicle and including an attaching part, one of said attaching parts being formed with a substantially cylindrical socket and the other being formed with an elongated spindle coaxial with the socket and extending through the socket in the direction of vehicle travel, a flat annular thrust plate of substantially uniform thickness rigidly secured to the spindle and extending radially therefrom substantially midway between the ends of the socket, a flat annular retention plate bolted to the socket part at each end thereof and projecting across each socket end toward the spindle part, and a resilient deformable rubber cushion annulus on each side of the thrust plate and confined between said thrust plate and one of the retention plates, the rubber annuli engaging said spindle and said socket part to resist movement therebetween, said retention plates being spaced radially from the spindle to provide radial clearance which permit twisting, radial shifting and vibrating of the spindle incidental to the working of the suspension system.

7. A torque and thrust controlling structure for the suspension system of a vehicle having a frame, a wheel-carrying axle, and resilient cushion means mounted on the axle near each side of the vehicle and interposed between the axle and the frame to support the frame on the axle while permitting tilting of the latter, said structure comprising: arm means secured to the axle and including a spindle elongated in the general direction of vehicle travel, a rigid bracket member depending from the frame of the vehicle and having an internally cylindrical portion of substantially uniform axial length forming a cylindrical socket surrounding and substantially coaxial with the spindle, a flat annular retention plate rigidly secured to said bracket at each end of the socket concentric to said socket and perpendicular to the axis of said socket, a flat thrust plate rigidly secured to said spindle in said socket substantially midway between the retention plates, said thrust plate having a generally circular outer edge with a diameter substantially greater than the internal diameter of said retention plates, and a resilient deformable rubber annulus interposed between the spindle and the cylindrical wall of said socket and confined between said thrust plate and each retention plate.

8. A torque and thrust controlling structure as defined in claim 7 wherein said spindle has an externally cylindrical portion of reduced diameter and an annular shoulder, said spindle engaging said shoulder and being held against the shoulder by a sleeve mounted on said reduced diameter portion, the end of said spindle being externally threaded to receive an internally threaded nut for preventing axial movement of said sleeve away from said shoulder.

9. A torque and thrust controlling structure as defined in claim 7, wherein said thrust plate is substantially smaller in diameter than said socket to provide an annular clearance between said thrust plate and socket, and wherein said rubber annulus has concentric inner and outer walls engaging substantially the entire surface of said spindle between said thrust plate and said retention plates and substantially the entire cylindrical wall of said socket to hold said thrust plate separated from the socket under normal loads.

References Cited in the file of this patent

UNITED STATES PATENTS

| Number | Name | Date |
|---|---|---|
| 1,199,547 | Hassler | Sept. 26, 1916 |
| 2,308,967 | Kuss | Jan. 19, 1943 |
| 2,369,501 | Wagner et al. | Feb. 13, 1945 |
| 2,417,690 | Keller | Mar. 18, 1947 |
| 2,508,634 | Ziegler | May 23, 1950 |
| 2,599,469 | Merry | June 3, 1952 |